(12) United States Patent
White

(10) Patent No.: US 11,536,002 B2
(45) Date of Patent: Dec. 27, 2022

(54) LUBRICATION SYSTEM FOR A VIBRATORY PILE DRIVER

(71) Applicant: John L. White, Seahurst, WA (US)

(72) Inventor: John L. White, Seahurst, WA (US)

( * ) Notice: Subject to any disclaimer, the term of this patent is extended or adjusted under 35 U.S.C. 154(b) by 110 days.

(21) Appl. No.: 16/562,075

(22) Filed: Sep. 5, 2019

(65) Prior Publication Data

US 2021/0071382 A1 Mar. 11, 2021

(51) Int. Cl.
*F16N 7/40* (2006.01)
*F16H 57/04* (2010.01)
*F16N 13/16* (2006.01)
*E02D 7/18* (2006.01)
*F16N 39/06* (2006.01)

(52) U.S. Cl.
CPC ........... *E02D 7/18* (2013.01); *F16H 57/0436* (2013.01); *F16N 7/40* (2013.01); *F16N 13/16* (2013.01); *F16N 39/06* (2013.01); *F16N 2210/12* (2013.01)

(58) Field of Classification Search
CPC . F16N 7/40; F16N 13/02; F16N 13/16; F16H 57/0436
See application file for complete search history.

(56) References Cited

U.S. PATENT DOCUMENTS

| | | | | |
|---|---|---|---|---|
| 2,753,014 A * | 7/1956 | Baudin | ...................... | F04B 7/04 184/105.1 |
| 6,296,078 B1 * | 10/2001 | Liu | ......................... | F16N 13/02 184/29 |
| 6,363,981 B1 * | 4/2002 | Butler | .................. | A01G 23/097 144/24.13 |
| 2014/0137677 A1 * | 5/2014 | White | ....................... | B06B 1/16 74/87 |
| 2014/0245845 A1 * | 9/2014 | Evarts | ....................... | F16N 7/40 74/61 |
| 2016/0298609 A1 * | 10/2016 | Bogaert | .................. | F16N 13/02 |

* cited by examiner

*Primary Examiner* — Minh Truong
(74) *Attorney, Agent, or Firm* — Clark A. Puntigam; Jensen & Puntigam P.S.

(57) ABSTRACT

The lubrication system includes a hydraulic cylinder pump which receives oil from the pile driver gearbox and an actuating mechanism connected to the pump to move oil therein through an exit line to a spray mechanism in the gearbox housing, providing lubrication to the gearbox bearings before the gearbox elements begin to operate.

8 Claims, 3 Drawing Sheets

LUBRICATION SYSTEM FOR A VIBRATORY PILE DRIVER

TECHNICAL FIELD

This invention relates generally to vibratory pile drivers, and more specifically to a lubrication arrangement for a gear box portion of a vibratory pile driver.

BACKGROUND OF THE INVENTION

It is vital in operation of a vibratory pile driver to properly lubricate the operating components of the gearbox portion of the pile driver, in particular the gearbox bearings, in order to reduce wear and extend their operating life. A splash-type lubrication system has historically been used, with a selected level of oil at the bottom of the gearbox. Typically, the oil level is generally enough to allow the eccentric and/or gear teeth to dip into the oil for lubrication. In operation of such a system, the counterweights and the gears will begin to turn when the motor, typically hydraulic, for the gearbox begins operation. However, at the very start of operation, the gearbox components, including the bearings, are dry. They are not lubricated by the conventional splash type system until a few revolutions of the eccentrics or gears pass through the oil and splash it onto the bearings. The bearings are initially dry because there are often substantial periods of non-use of a pile driver, which allows all of the oil on the bearings accumulated during the past operation to drain off. The lack of lubrication at the very start of the next gearbox operation, with speed thereafter increasing to operating speed, for instance 1600 rpm, increases the wear of the bearings, often resulting in early bearing failure, which in turn requires expensive repair and downtime of the pile driver.

Accordingly, it would be desirable to have a lubricating system for the gearbox which begins prior to or at start-up of the pile driver operation.

SUMMARY OF THE INVENTION

Accordingly, the lubrication system comprises: a gearbox assembly with a gearbox housing, for a vibratory pile driver which includes a set of axles, a set of counterweights mounted on the axles, a set of gears mounted on the axles with bearings, and a drive motor for the gearbox assembly, wherein in operation, the counterweights produce a vibration action of the gearbox, and wherein the gearbox further includes a layer of lubricating oil at the bottom of the gearbox; a pump assembly mounted in the vicinity of the gear box; an oil entry line extending from the oil in the gearbox to the pump assembly, wherein oil is present in the pump assembly prior to operation of the gearbox assembly; an oil exit line extending from the pump assembly to an inlet in the gearbox housing; an actuating system to operate the pump assembly at a selected time, relative to operation of the gearbox assembly, wherein operation of the pump assembly moves oil through the oil exit line to the gearbox housing; and a spray mechanism in the gearbox housing to which the oil exit line is connected, producing a spray for lubrication of the bearings in the gearbox assembly.

BEST MODE FOR CARRYING OUT THE INVENTION

Figure 1:
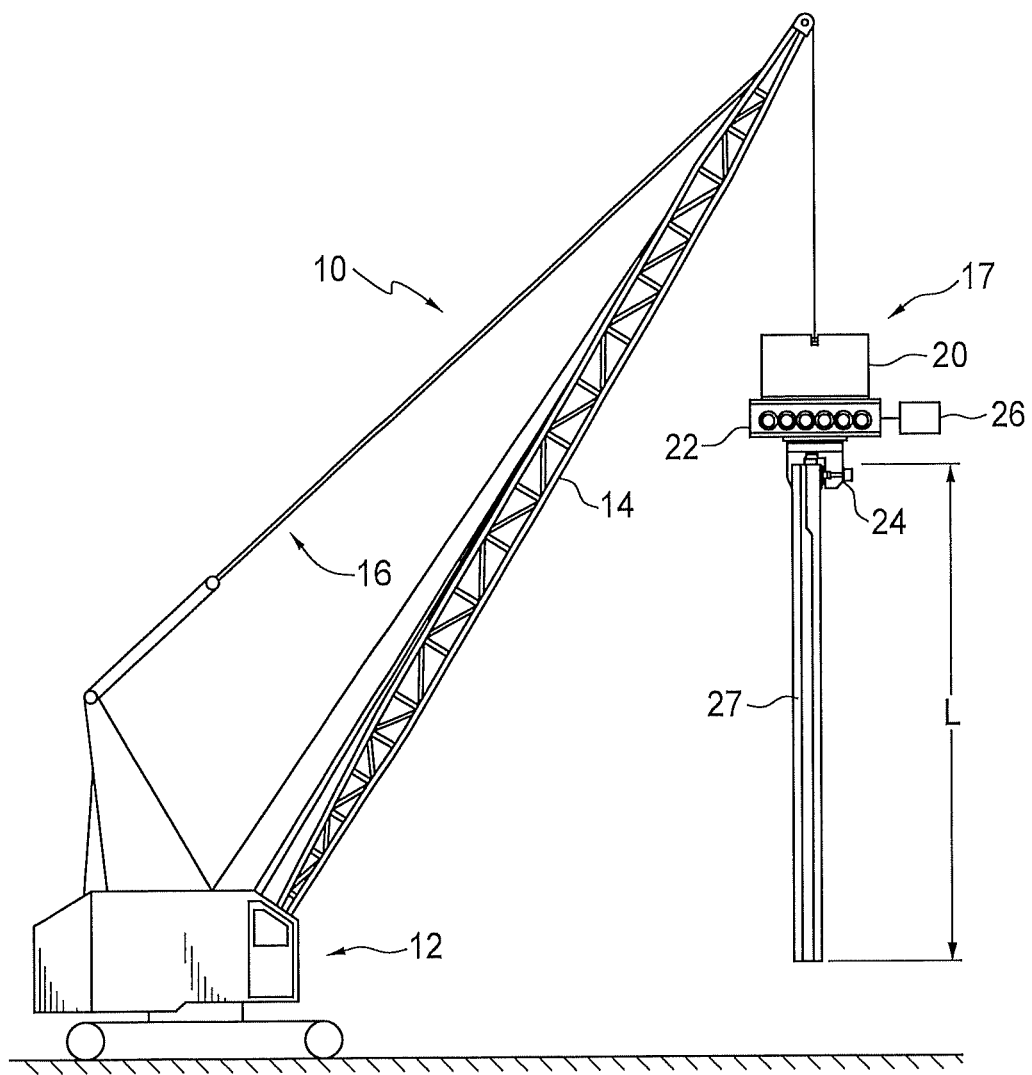
FIG. 1 is a perspective view showing the major components of a vibratory pile driver.

FIG. 1 is a schematic view of a conventional vibratory pile driver system, shown generally at 10. It includes a conventional construction crane 12, with an extending boom 14 and a system of control cables 16. At the end 18 of boom 14, the control cable extends downwardly to the vibratory pile driver assembly 17. The assembly generally includes a suppressor 20, a gearbox 22 and a clamp system 24, as well as a drive motor 26 for the assembly, usually hydraulic, although it could alternatively be an electric motor. All of these elements are conventional and hence do not require detailed explanation. The clamp 24 clamps the gearbox and the suppressor onto a pile 27 with a length L which in operation is to be driven into the ground.

Figure 2:
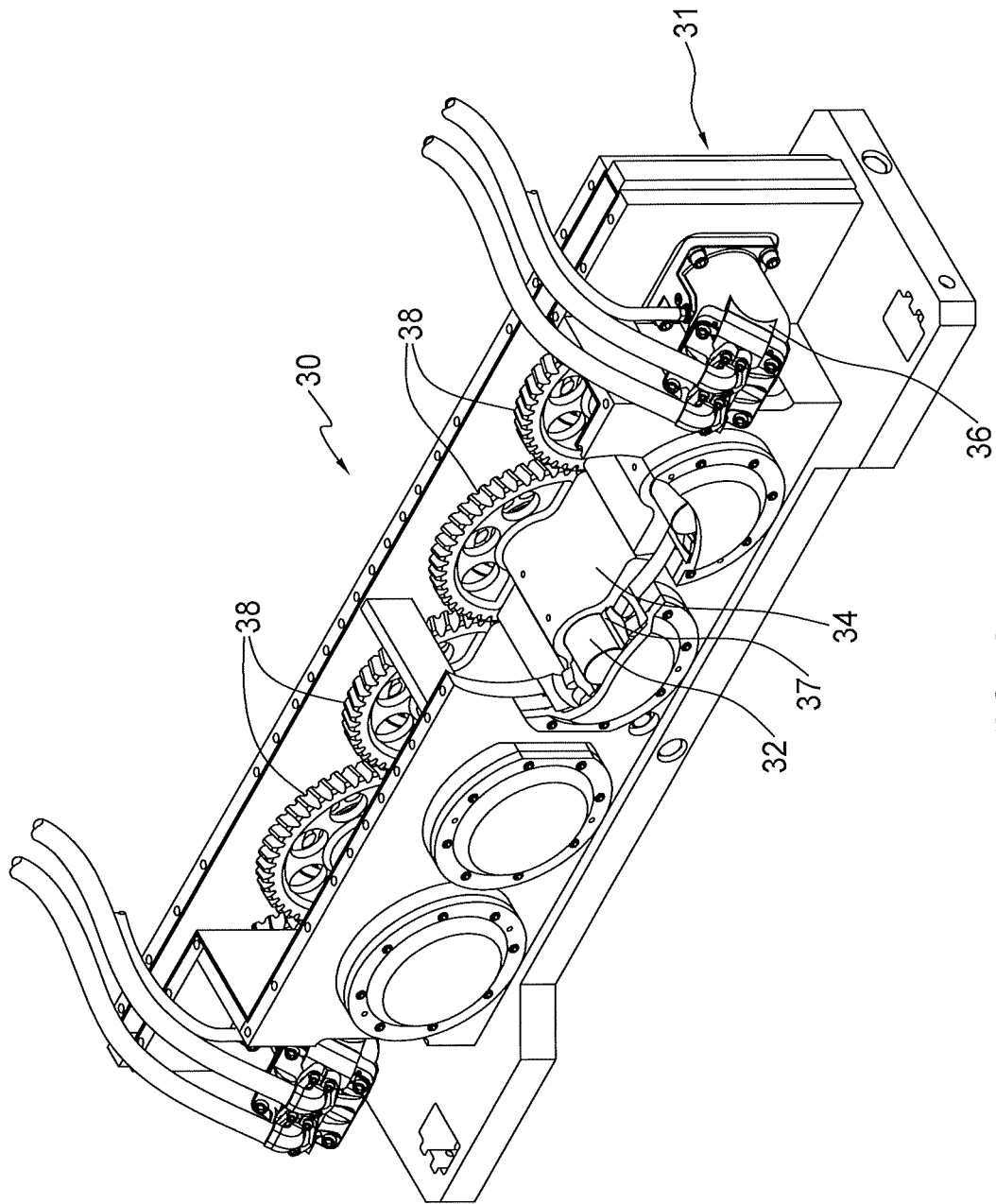
FIG. 2 is an isometric view showing the typical components of a gear box used in a vibratory pile driver system.

FIG. 2 shows a conventional vibratory pile driver gearbox. The gearbox shown generally at 30 includes a housing 31 generally made from steel. While the dimensions of the housing can vary, a typical system would be 14 inches by 96 inches by 24 inches, which is for example only. At the bottom of the gearbox is a layer of hydraulic oil (not shown), typically approximately 1 inch deep, which provides conventional splash lubrication for the gearbox components, in particular the bearings, in operation of the vibratory pile driver. It is important that the oil level be high enough to provide splash lubrication during operation of the system, but not so high that the oil overheats. Mounted in the gearbox on axles, for example axle 32, are eccentric counterweights, of which counterweight 34 is an example. In FIG. 2, there are illustrated four axles and four eccentric counterweights. Counter-rotating gears 38 mounted on the respective axles mesh together as the axles rotate. The eccentrics and the gears are mounted on the axles by bearings represented at 37. Drive motors 36, typically hydraulic, operating with oil pressure from a source (not shown), drive the gearbox components. The counterweights are arranged so that vibratory up-down action results when the counterweights are in their respective up or down positions. In all other positions of the counterweights, dynamic action is cancelled.

As indicated above, it is important in operation of the gearbox that the bearings be well lubricated. The conventional splash system works effectively after the counterweight/gear assemblies have made a number of turns thereafter, increasing to 1600 rpm or other selected rate. In many cases, a clear viewing port, referred to as an eye (not shown in FIG. 2), is provided in the housing 31 in order to ascertain the level of oil and the operation of the splash system. As indicated above, however, the splash system is not effective at startup, when the bearings 37 are dry. This can result in early bearing failure.

Figure 3:
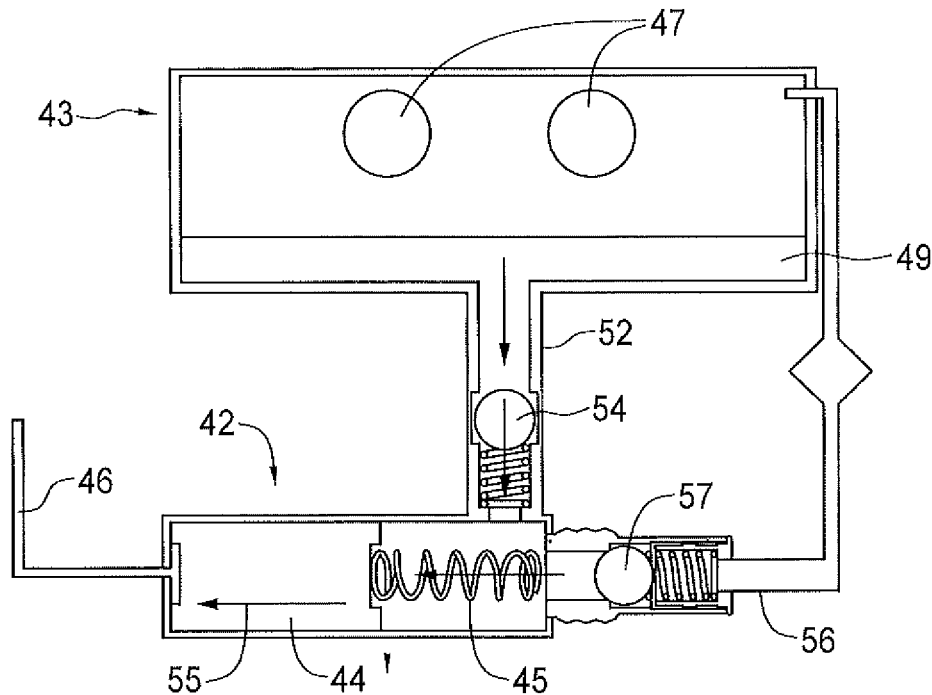
FIG. 3 is a diagram showing the system of the present invention in a first operating state.
Figure 4:
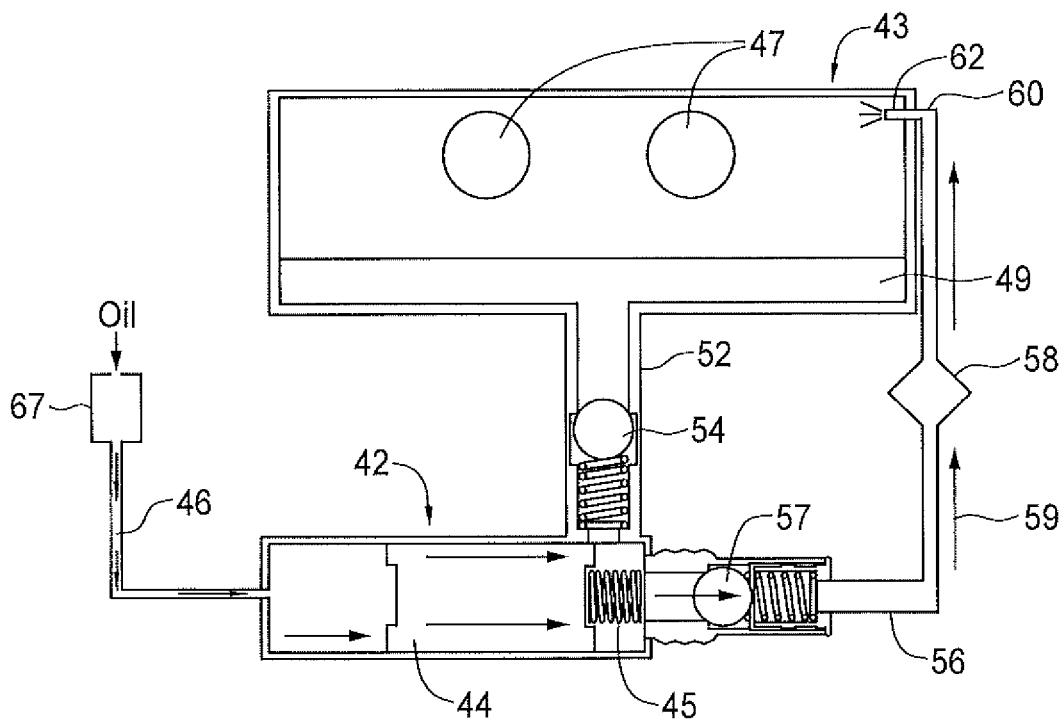
FIG. 4 is a diagram showing the system of the present invention in a second operating state.

Referring now to FIGS. 3 and 4, the early lubrication system of the present invention is illustrated. FIGS. 3 and 4 show a gearbox 43 in general with gears, eccentrics and bearings shown generally at 47. A selected level of oil, e.g. one inch or so, is represented at 49. The present system is arranged to provide a stream or squirt of oil onto the bearings prior to or at the time that the system begins operating and the gears and counterweights begin to move.

The system includes a hydraulic cylinder 42 which operates as a pump, and includes a movable piston 44 mounted therein with a spring 45. A hydraulic oil line 46 connects the hydraulic cylinder to either the oil lines for the clamp system for the gearbox or the drive system for the gearbox. When the vibratory pile driver is not in use, there is no oil in line 46 and hence, no hydraulic pressure on cylinder 42 (FIG. 3), which allows spring 45 to expand, forcing piston 44 to retract, as shown by arrow 55 in FIG. 3. The retraction of the piston results in oil from gearbox 50 moving into the cylinder 42, either by gravity action or a sucking action produced by the piston retracting The oil moves down through inlet line 52, passing through one-way inlet check valve 54. Check valve 54 comes off its seat, allowing oil from gear box 43 to move into the hydraulic cylinder 42 for loading, but does not allow it to move back into gearbox 43 from the hydraulic cylinder. Check valve 57 prevents oil from moving through outlet line 56. Cylinder 42 now has oil in it, in effect loaded, with piston 44 retracted. The early lubrication system is now ready for operation, prior to operation of the gearbox elements by the motor.

Now referring to FIG. 4, when the clamping system or the drive circuit is initiated, prior to operation of the gearbox elements, oil from the clamping system or the drive circuit is directed under pressure by actuating system 67 through line or hose 46 to hydraulic cylinder 42, which forces piston 44 to compress spring 45. This action of piston 44 forces oil in the hydraulic cylinder 42 through one-way check valve 57 in outlet line 56, as shown by arrow 59. Oil proceeds through outlet line 56, filter 58 and then up to an inlet 60 in the gearbox. If the filter 58 fails or does not pass oil, the present splash system still functions. Some forced lubricating systems fail due to the filter being clogged. The inlet 60 at the gearbox includes a sprayer element 62, which can be mounted in various locations in order to provide complete coverage for the gearbox bearings. There may be more than one sprayer, to provide desired coverage. The result may be a stream or a spray. The volume of a spray can vary, using a nozzle for each bearing or a wide nozzle that sprays oil to multiple bearings at the same time. One stream example is ⅛ inch diameter and 68 inches long, directed to each bearing.

The significant advantage of the present invention is that the bearings in the gearbox are lubricated before the gearbox elements (counterweights, gears etc.) begin to move. Typically, only one spray is necessary to provide initial lubrication. As the gear box elements begin to move and then up to operating speed, for instance 1600 rpm, the splash lubrication system takes over and provides adequate lubrication during operation. The present system, besides providing initial lubrication, has the advantage of eliminating the need for filtering of the splash oil. A splash oil filter tends to quickly clog.

Accordingly, a system for early lubrication of gearbox elements, in particular the bearings, has been disclosed. Early lubrication has the advantage of preventing early bearing failure, so that the gearbox has its ordinary useful life, if not beyond.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A lubrication system for a vibratory pile driver, comprising:
   a gearbox assembly, with a gearbox housing, for a vibratory pile driver which includes a set of axles, a set of counterweights mounted on the axles, a set of gears mounted on the axles with bearings, and a drive motor for the gearbox assembly, wherein in operation, the counterweights produce a vibration action of the gearbox assembly, wherein a layer of lubricating oil is maintained at the bottom of the gearbox assembly during operation of the gearbox assembly;
   a pump assembly, separate from the gearbox assembly, the pump assembly including a moveable member therein having a retracted position and a forward position for moving oil out of the pump assembly, wherein the movable member is in its retracted position when the vibratory pile driver is not in use;
   an oil entry line extending from the gearbox assembly to the pump assembly, permitting movement of oil through a one-way check valve from the gearbox assembly to the pump assembly when the vibratory pile driver is not in use, such that oil is present in the pump assembly prior to operation of the gearbox assembly and the moveable member is in its retracted position;
   an actuating system separate from, and operative prior to operation of, the gearbox assembly for moving oil under pressure to the pump assembly, forcing the moveable member in the pump assembly to its forward position, resulting in movement of oil present in the pump assembly through a one-way check valve to an oil exit line, which extends from the pump assembly to an inlet in the gearbox housing, the oil reaching the inlet prior to operation of the gearbox assembly; and
   a spray mechanism in the gearbox housing to which the oil exit line is connected, the spray mechanism operative to produce a spray for lubrication of the bearings in the gearbox assembly prior to operation of the gearbox assembly.

2. The lubricating system of claim 1, wherein the actuating system initiates action of the pump upon clamping of the gearbox assembly to a pile to be driven or initiation of the drive assembly for the gearbox assembly.

3. The lubricating system of claim 2, wherein action of the spring on the piston draws oil from the gearbox assembly into the hydraulic cylinder or oil moves by gravity from the gearbox assembly into the hydraulic cylinder.

4. The lubricating system of claim 1, wherein the pump assembly is a hydraulic cylinder, including a piston and a spring, wherein the spring maintains the piston in a retracted position until the actuating system operate operates to move the piston to compress the spring and move the oil present in the hydraulic cylinder into the exit line.

5. The lubricating system of claim 4, including a filter element in the oil exit line from the hydraulic cylinder.

6. The lubricating system of claim 1, wherein the spray mechanism is a spray nozzle directing oil into the gearbox assembly toward the bearings.

7. The lubricating system of claim 1, wherein the spray mechanism produces a stream of oil directed towards the bearings.

8. The lubricating system of claim 1, wherein the pump produces a single spray or stream during each separate operation of the gearbox assembly.

\* \* \* \* \*